United States Patent [19]

Mounet

[11] Patent Number: 4,986,313
[45] Date of Patent: Jan. 22, 1991

[54] SEALING PLUG FOR A STEAM-GENERATOR TUBE

[75] Inventor: Jean-Charles Mounet, Meyzieu, France

[73] Assignee: Framatome, Courbevoie, France

[21] Appl. No.: 420,484

[22] Filed: Oct. 12, 1989

[30] Foreign Application Priority Data

Oct. 12, 1988 [FR] France .................. 88 13434

[51] Int. Cl.⁵ ............................................. F16L 55/00
[52] U.S. Cl. ............................................ 138/89; 165/71
[58] Field of Search ................... 138/89, 90; 165/71, 165/76; 376/203, 204

[56] References Cited

U.S. PATENT DOCUMENTS

| | | |
|---|---|---|
| 1,794,369 | 3/1931 | Edgar . |
| 3,119,177 | 1/1964 | Knecht .................. 138/89 |
| 3,156,373 | 11/1964 | Willis ..................... 138/89 |
| 4,765,374 | 8/1988 | Ermold et al. . |
| 4,771,810 | 9/1988 | Ermold et al. ........... 138/89 |

FOREIGN PATENT DOCUMENTS 0035911 9/1981 European Pat. Off. .
2597771 10/1987 France .
2599463 12/1987 France .

*Primary Examiner*—James E. Bryant, III
*Attorney, Agent, or Firm*—Pollock, Vande Sande & Priddy

[57] ABSTRACT

The plug comprises a tubular body (2), closed at one of its ends by a bottom (3), a bush (5) placed inside the body (2) in an expansion zone and an expander core (6). The bush (5) has at least two elastic cylindrical sectors, separated by at least two longitudinal slots (8), and an actuating surface (5c) widened in the direction of the bottom (3) of the plug. The expander core (6) engaged inside the slotted bush (5) has a corresponding actuating surface (6c) on its outer surface. The plug (1) can be expanded by shifting the expander core (6) towards the open end of the body (2) of the plug opposite its bottom (3), and can be removed simply by pushing the expander core (6) against the bottom (3) of the body (2) of the plug (1).

7 Claims, 3 Drawing Sheets

SEALING PLUG FOR A STEAM-GENERATOR TUBE

FIELD OF THE INVENTION

The invention relates to a sealing plug of a steam-generator tube.

BACKGROUND OF THE INVENTION

Steam generators of pressurized-water nuclear reactors comprise a casing of general cylindrical shape, within which a water box is delimited by a tube plate of great thickness, to which the bundle of tubes of the steam generator is fastened. Each of the tubes of the bundle comprises two straight parallel branches, the end parts of which are fastened inside the tube plate, usually by flanging and by welding.

When the steam generator is in operation, the tubes are in contact both with the primary fluid of the nuclear reactor, consisting of pressurized water, and with the secondary fluid consisting of feed water which evaporates. Under the operating conditions of the steam generator, the tubes are liable to suffer various kinds of damage and, in particular, corrosion by the fluids with which they are in contact. Some tubes of the steam generator can become defective during service and, for example, experience cracks causing leaks which give rise to contamination of the secondary fluid.

It is therefore necessary, during the periods of maintenance of the reactor, to take action on the steam generator and carry out the plugging of the tubes which exhibit damage liable to cause leaks.

There are known sealing plugs of the tubes of a steam generator, which comprise a body of tubular shape, closed at one of its end$ by means of a bottom, and likewise tubular clamping means introduced into the bore in the plug body in order to obtain the diametral expansion of the plug after it has been inserted into the tube of the steam generator.

The clamping means can comprise, in particular, a bush made of a metal, such as nickel, and a core made of a nickel alloy having the capacity to return to its original shape, these two components being intended to interact in order to obtain the radial expansion of the body of the plug and its fastening in the tube.

The bush and the expander core have mutually corresponding actuating surfaces which interact when the expander core is engaged into the bush in order to obtain the diametral expansion of the bush and of the plug body. The expander core is introduced into the bore in the bush when the plug is in place in the tube of the steam generator, and the actuating surfaces of the bush and of the core generally consist of frusto-conical bearing surfaces widened in the direction of the orifice in the body of the plug located opposite its bottom.

When the plug is brought to the operating temperature of the steam generator inside this generator, the expander core having the capacity of returning to its original shape experiences a diametral expansion which ensures a matching expansion of the plug body and the leak-proof closure of the tube of the steam generator.

However, such plugs which ensure effective sealing of the tubes of the steam generator have some disadvantages.

On the one hand, the nickel alloys having the capacity of returning to their original shape, which are used to make the expander core, have insufficient resistance to corrosion by the primary fluid of the reactor, at the operating temperature.

On the other hand, the leakproof clamping of the plug by pushing the expander core into the bush requires considerable exertion in order to overcome the frictional forces and deform the metal of the bush and of the plug body.

Moreover, it may prove necessary to carry out the removal of plugs which have been installed in steam-generator tubes. This is especially true when there has been preventive plugging of some tubes of the bundle which are subsequently returned to service after treatment, for example stress relief, making it possible for them to resist corrosion.

Likewise, it may prove advantageous to return to service tubes of the steam-generator bundle which have cracks, where effective processes for the repair of these tubes have recently become available.

The sealing plugs, such as those described above, can be removed by first carrying out the extraction of the core and then by drawing the plug body so as to cause contraction allowing it to be removed.

Such a removal process can be put into practice by using the device described in applicant's French Patent 87- 14326.

This two-stage process is relatively long and complicated to put into effect and requires the use of a complex tool. Moreover, there are some risks of breakage of that end part of the plug body on which a push is exerted, before the fastening and clamping part of the plug body has been separated from the inner wall of the tube of the steam generator.

SUMMARY OF THE INVENTION

The object of the invention is, therefore, to provide a sealing plug of a steam-generator tube, comprising a tubular body, closed at one of its ends by means of a bottom, and means of diametral expansion of the plug, which consist of a bush placed inside the body of the plug in an expansion zone and of an expander core having an actuating surface intended to interact with a corresponding surface of the bush in order to obtain its diametral expansion and the expansion of the plug, this plug, completely resistant to corrosion by the primary fluid of the steam generator, being capable of being installed in a tube quickly and without difficulty, so as to ensure effective leakproof sealing of the latter, and being capable subsequently of being extracted, all in a single operation and without the risk of breakage of part of the plug which gives rise to the presence of a detached piece inside the tube.

To this end, the bush comprises at least two elastic cylindrical sectors, separated by at least two longitudinal slots, and, on its inner surface, an actuating surface widened towards the bottom of the plug, the expander core engaged into the slotted bush having, on its outer surface, a corresponding actuating surface located on the same side as the bottom of the plug in relation to the actuating surface of the bush, when the plug is in its non-expanded state allowing it to be inserted into the tube, the expansion of the plug being obtainable by shifting the expander core, inside the bush, towards the open end of the body of the plug opposite its bottom.

BRIEF DESCRIPTION OF THE DRAWINGS

To make it easy to understand the invention, an embodiment of a sealing plug according to the invention and a process for fitting and removing this plug in a steam-generator tube of a pressurized-water nuclear reactor will now be described by way of example, with reference to the accompanying drawings.

DESCRIPTION OF PREFERRED EMBODIMENTS

Figure 1:
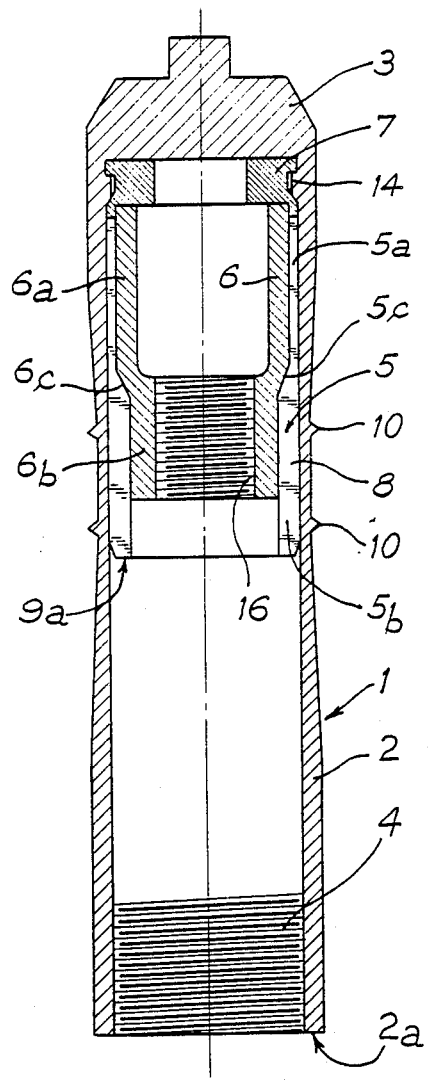
FIG. 1 is a view of a plug according to the invention in axial section.

FIG. 1 shows a plug 1 according to the invention, comprising a tubular body 2 closed at one of its ends by means of a solid bottom 3 and having the opposite end open. The inner bore of the tubular body 2 is internally threaded over a part 4 of its length, near the open end of the body 2.

Means of diametral expansion, consisting of a bush 5 and an expander core 6, are arranged inside the body 2. The bush 5 bears on the bottom 3 by means of an annular bottom 7 and, starting from the annular bottom 7, comprises a first part 5a of small wall thickness and a second part 5b of large wall thickness which are separated by a frusto-conical surface 5c widened towards the bottom 3 of the plug.

The inner bore of the bush 5 therefore comprises a part of large diameter and a part of small diameter which are separated by a frusto-conical surface.

In FIG. 1, the plug is shown in a non-expanded state, the outside diameter of the body 2 being slightly less than the inside diameter of a tube of the steam generator.

The body of the plug, in its part facing the part 5b of small inside diameter of the bush, has, on its outer surface, two circular male splines 10 intended for ensuring the anchorage of the plug in a steam-generator tube, as will be explained hereinbelow.

Figure 2:
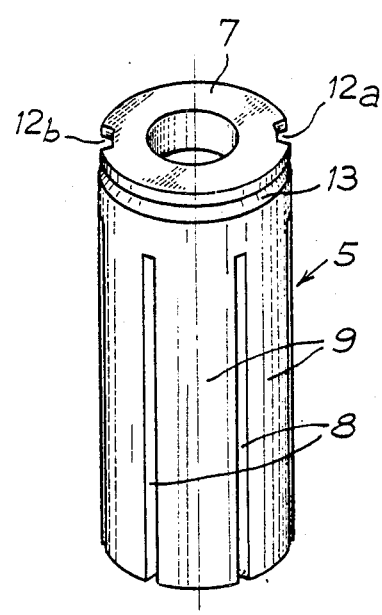
FIG. 2 is a perspective view of the slotted bush of the plug shown in FIG. 1.

As can be seen in FIGS. 1 and 2, the bush 5 has longitudinal slots 8 delimiting cylindrical sectors 9 or lamellae which can be deformed elastically so as to move away from one another and ensure the diametral expansion of the bush 5.

The bush 5 is machined internally, in such a way that each of the lamellae has a part of small thickness corresponding to the part 5a of the bush, a part of large thickness corresponding to the part 5b of the bush and an inclined part widened towards the bottom 7 and corresponding to the part 5c of the bush 5.

The annular bottom 7 of the bush 5 is provided with a peripheral groove 13 and two radial notches 12a and 12b opening into the groove 13 and, with two snugs 14 machined in the inner wall of the plug body 2, forming a bayonet fastening making it possible to secure the bush 5 against the body 2 of the plug, as shown in FIG. 1.

Figure 3:
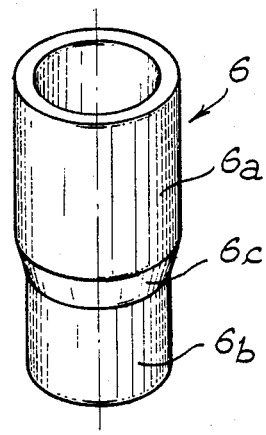
FIG. 3 is a perspective view of the expander core of the plug shown in FIG. 1.

FIG. 3 shows the expander core 6 which is produced in tubular form and which comprises a part of large outside diameter 6a, a part of small outside diameter 6b and a frusto-conical connecting part 6c between the parts 6a and 6b.

The part 6b of small diameter of the expander core has an internal thread 16.

The plug 1 can be fitted in the following way.

In the first place, the expander core 6 is introduced into the bore of the bush 5 with its entry part of small diameter. The introduction of the expander core 6 is made possible by the elasticity of the lamellae 9. The expander core 6 is pushed in the axial direction of the bush 5, up to the moment when its end abuts against the annular bottom 7 of the bush.

The core is then in its position shown in FIG. 1, inside the bush 5. The parts 6a, 6b and 6c of the core 6 are thus arranged respectively inside the parts 5a, 5b and 5c of the bush 5.

The bush 5 is then introduced into the body 2 of the plug, so as to ensure that the annular bottom 7 is fastened under the bottom 3 of the body 2 by means of the bayonet fastening 12a, 12b, 14.

The plug, in its configuration illustrated in FIG. 1, can then be used to carry out the plugging of a steam-generator tube.

The frusto-conical surface 6c of the core 6, widened upwards and forming the actuating surface of this core, is located above, i.e., on the same side as the bottom 3, in relation to the corresponding actuating surface 5c of the bush 5.

Figure 4:
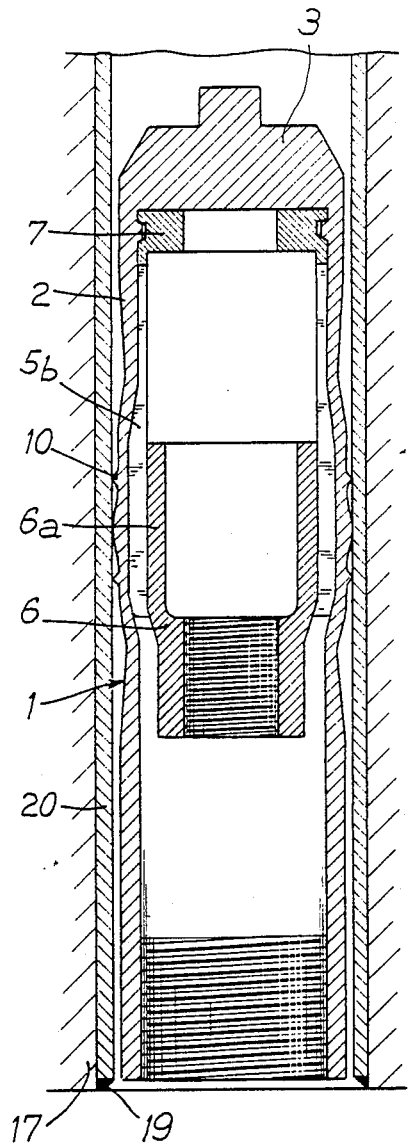
FIG. 4 is a view in axial section of a plug according to the invention in the sealing position in a steam-generator tube.

In FIG. 4, the end part of a tube 20 of a steam generator is shown fitted inside a tube plate 17 and fastened sealingly to this plate by means of an annular welded joint 19.

To carry out the installation and sealing fastening of the plug 1 inside the tube 20, a tool of a known type is used, this tool comprising a body coming to bear on the open end 2a of the plug, and a rod, the threaded end of which is screwed into the internally threaded part 16 of the expander core 6.

The plug connected to the fitting tool is introduced into the tube 20, in such a way that its open end 2a opposite the bottom 3 comes flush with the entry face of the tube plate 17, as shown in FIG. 4.

The body of the tool is connected to a support, and the rod is actuated by means of a mechanical or hydraulic device in order to exert a downward pull on the core 6.

The mutually corresponding actuating surfaces 6c of the core and 5c of the bush interact in order to obtain the diametral expansion of the bush 5 and of the body 2, of which the circular splines 10 brought in contact with the wall of the tube are flattened and penetrate slightly into the metal.

The core 6 is shifted downwards, up to the moment when it assumes the position shown in FIG. 4. The part 6a of large diameter of the core 6 is then inside the part of large wall thickness 5b of the bush 5 which has undergone radial expansion as a result of the deformation of the lamellae 9.

The body 2 of the plug is thus fastened inside the tube 20 in a resistant and leakproof manner, the splines 20 being anchored in the inner wall of the tube.

It is then possible to remove the tool by unscrewing the threaded part of this tool engaged in the internally threaded part 16 of the expander core.

The fitting tool can be actuated manually by an operator who has entered the water box of the steam generator located under the tube plate 17, or can be installed and actuated by means of an automatic device introduced into the water box of the steam generator and controlled from outside the water box.

Figure 5:
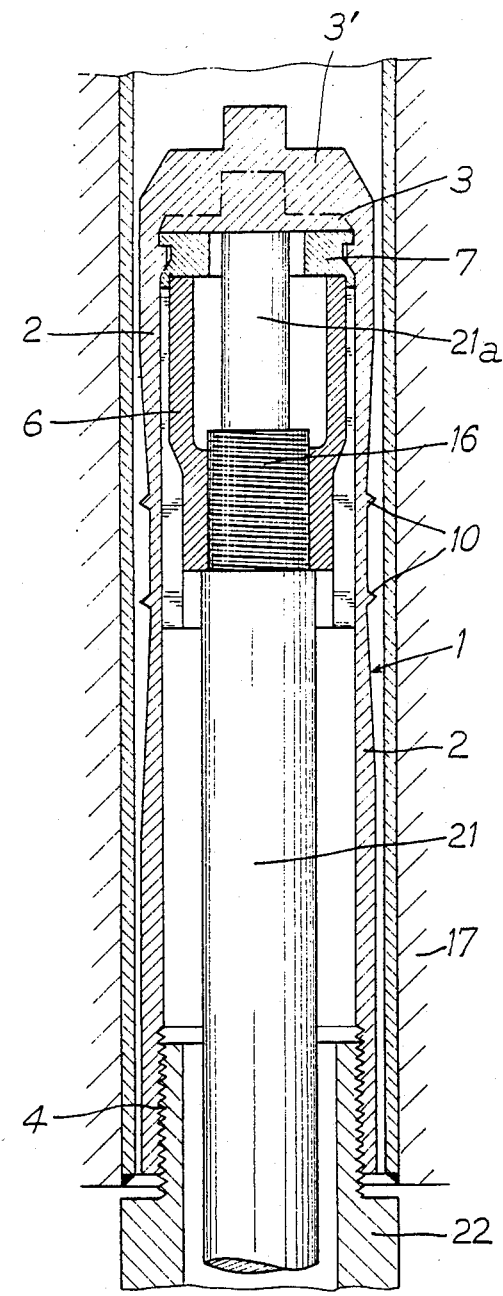
FIG. 5 is a view in axial section of a sealing plug according to the invention during its removal.

FIG. 5 illustrates a plug 1 according to the invention during its removal.

For this removal, the tool used can be a tool which serves for fitting the plug and which was described above. It is sufficient that the rod of the tool be capable of being actuated in both directions, so as to exert a push on the expander core 6 for the purpose of removal.

As can be seen in FIG. 5, the end of the push rod 21 is fastened by screwing in the internal thread 16 of the core 6. The body of the tool 22 is screwed into an internally threaded part 4 of the body 2 of the plug. A push is exerted on the core 6 in the direction of the bottom 3 of the plug by means of the rod 21. The rod 21 has an extension 21a of reduced diameter which is located beyond its threaded part and which comes to bear on the bottom 3 of the plug when the core 6 moves from its position shown in FIG. 4 to a position set back towards the annular bottom 7 of the bush 5. A push is thus exerted on the bottom of the plug, the open end 2a of which is connected to the body of the tool by means of the internally threaded part 4.

Figure 6:
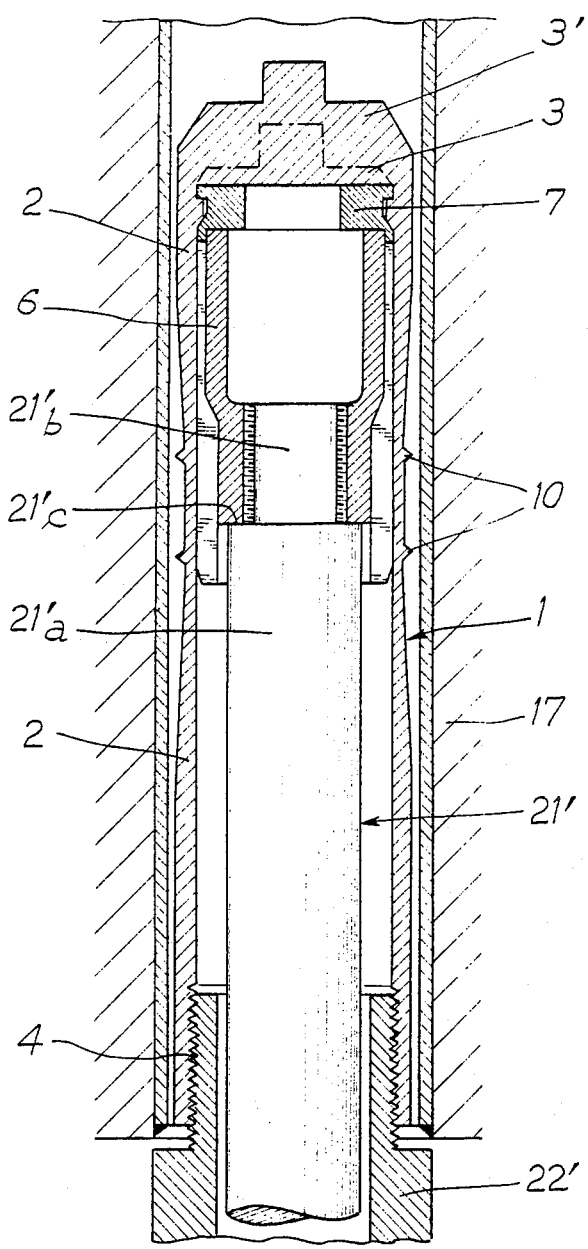
FIG. 6 is a view in axial section of a second embodiment of a sealing plug according to the invention during its removal.

FIG. 6 illustrates an alternative embodiment of the tool, comprising a body 22', similar to the body 22 of the tool shown in FIG. 5, and a rod 21' comprising a part of large diameter 21'a and a part of small diameter 21'b which are separated by a shoulder 21'c. The rod 21' has no threaded part and engages by means of its part 21'b into the bore of the core 6. The shoulder 21'c then comes to bear on the end of the core 6. A push can thus be exerted on the bottom of the plug 3 by means of the core 6 via the rod 21' of the tool.

The body 2 of the plug therefore experiences an extension in the axial direction, the bottom of the plug changing from its position 3 to its position 3'. This axial extension of a few millimeters makes it possible to reduce the diameter of the deformed part of the body 2 of the plug by contraction, so that the circular splines 10 are extracted from the wall of the tube 20. The plug body 2, which is no longer anchored in the wall of the tube 20, can then be extracted from the tube, without the tube being scratched or otherwise damaged during the extraction.

Where preventive plugging of the tube is concerned, the tube of the steam generator can therefore be reused, after the plug has been removed.

Furthermore, the removal has been carried out in a single operation, without the need to extract the expander core beforehand.

The fitting of the plug in the workshop, involving introducing the expander core into the slotted bush and then inserting the bush into the plug body and fastening it there, can be carried out very easily and very quickly, especially as a result of the flexibility and elasticity of the slotted bush 5.

A tool which keeps the bush 5 up against the bottom 3 by pushing on the end 9a of the lamellae is used; the core 6 is then pulled downwards a few millimeters so as to start the deformation, thus making it possible to screw the tool into the internal thread 16 without the risk of rotation of the core 6.

After fitting, the expander core is retained inside the bush by the actuating surfaces 6c and 5c in mutual contact. Since the bush 5 is itself fastened to the bottom of the plug, this plug forms an assembly of which the elements are inseparable.

Because of the presence of deformable lamellae forming the bush, a plug which undergoes considerable diametral expansion during fitting can be designed. The plug is thus capable of being used to obtain the sealing of tubes the inside diameters of which can vary within a relatively wide range.

Moreover, at the moment of fitting, the presence of the flexible lamellae makes it possible to limit the pulling forces to be exerted in order to obtain the diametral expansion. The slotted bush performs the function of a compensator and distributor of loads during the diametral expansion of the plug.

The decrease in the forces to be exerted for fitting the plug makes it possible to limit and even eliminate any risk of breakage of the casing of the plug body during fitting.

On the other hand, removal is quicker because it can be carried out in a single operation. Even when there is a seizure of the expander core in the bush, removal can still be carried out, the deformation then proceeding as a result of the bending of lamellae forming the bush.

Should the upper part of the plug break during removal, this upper part remains captive since it continues to be fastened to the end of the slotted bush which is itself engaged on the expander core fastened to the push rod.

In the event of seizure of the expander core inside the slotted bush, the lamellae of the bush are capable of bending, thus allowing a push to be exerted on the expander core in order to bring it to bear against the bottom of the bush and of the plug. If the casing of the plug body breaks, the plug can still be removed without difficulty, the anchoring splines of this plug body having been released beforehand.

The plug according to the invention is fastened inside the tube in a highly effective way, thus making it possible to use it both for the preventive plugging of a tube in the workshop and for the plugging of a tube during a maintenance operation carried out on the steam generator.

To fasten the bush inside the plug body, it is possible to use a device other than a bayonet device. For example, this fastening can be carried out by snapping, by external hammering of the plug body, by means of a screwed connection, by shrinkage, by electron-beam welding or by deformation of the bush in a groove at the bottom of the plug.

The bush can comprise a number of any cylindrical sectors, and these cylindrical sectors can be numerous and be simple lamellae.

In a preferred embodiment, the plug body is made of a nickel alloy, such as Inconel 690, the bush is made of nickel 201 and the expander core is made of strain-hardened stainless steel 316. These materials resist corrosion by the primary fluid of the reactor and have the requisite mechanical characteristics. However, it is possible to use other materials, the mechanical characteristics and corrosion resistance of which would be equivalent or comparable.

In order to carry out the fixing and removal of the plug according to the invention, any suitable device, particularly the device described in French Patent No. 87-14326, can be used.

Finally, the sealing plug according to the invention can be used to carry out the plugging of any steam-generator or heat-exchanger tube of equivalent structure, whatever the diameter of the tubes. The plug according to the invention can be used in a sector other than the nuclear industry.

What is claimed is:

1. Sealing plug of a steam-generator tube (20) comprising a tubular body (2), a bottom (3) closing one end of said tubular body, and means of diametral expansion (5, 6) of said plug, said means comprising a bush (5) placed inside a body (2) of said plug in an expansion zone and an expander core (6) having an actuating surface (6c) interacting with a corresponding surface (5c) of said bush (5) in order to produce its diametral expansion and expansion of said plug, wherein said bush (5) comprises at least two elastic cylindrical sectors (9) separated by at least two longitudinal slots, and, on its inner wall, an actuating surface (5c) widened towards said bottom (3) of said plug, the expander core (6) engaged inside said slotted bush (5) having, on its outer surface, a corresponding actuating surface (6c) located on a same side as said bottom (3) of said plug in relation to said actuating surface (5c) of said bush (5), when said plug (1) is in its unexpanded state allowing it to be introduced into said tube (20), expansion of said plug being obtained by shifting said expander core (6) inside said bush (5) towards an open end of said body (2) of said plug opposite said bottom (3).

2. Sealing plug according to claim 1, wherein said bush (5) comprises an annular bottom (7), contacting said bottom (3) of said body (2) of said plug 1), and, starting from said annular bottom (7), a first part of small thickness (5a and a second part of large thickness (5b) which are separated, in the inner bore of said bush (5), by a frusto-conical surface (5c) forming said actuating surface of said bush.

3. Sealing plug according to claim 2, wherein said annular bottom (7) of said bush comprises means (12a, 12b, 13) for fastening said bush in said body (2) of said plug (1), said means being complementary to means (14) arranged inside said body (2) adjacent said bottom (3) of said plug.

4. Sealing plug according to claim 3, wherein said bush (5) is fastened in said body (2) of said plug by means of a bayonet fastening, the connecting means of said bush comprising a groove (13), and the corresponding fastening means of said body (2) consisting of snugs (14) projecting radially towards the inside of the bore of said body (2), adjacent said bottom (3).

5. Sealing plug according to claim 1, wherein said plug body (2) has an internally threaded part 94) at its open end opposite said bottom (3), and said expander core (6) has an internally threaded part (16), said internally threaded parts (4, 16) of said plug body and said expander core making it possible to connect the plug to a tool for pulling and pushing said expander core (6) towards the open end of said body (2) and towards said bottom (3) of said body (2), respectively.

6. Sealing plug according to claim 1, wherein said expander core (6) consists of a tubular body having a first part (6a) of large outside diameter, a second part (6b) of small outside diameter and an outer surface (6c) of frusto-conical shape between said first and second parts.

7. Sealing plug according to claim 1, wherein said plug body (2) and said bush (5) are made of a nickel alloy and said expander core (6) is made of stainless steel.

* * * * *